United States Patent
Yamaguchi

(12) 
(10) Patent No.: US 10,591,675 B2
(45) Date of Patent: Mar. 17, 2020

(54) OPTICAL SPACE TRANSMISSION SYSTEM

(71) Applicant: NEC Corporation, Minato-ku, Tokyo (JP)

(72) Inventor: Hiroshi Yamaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 26 days.

(21) Appl. No.: 15/911,530

(22) Filed: Mar. 5, 2018

(65) Prior Publication Data

US 2018/0267249 A1    Sep. 20, 2018

(30) Foreign Application Priority Data

Mar. 16, 2017  (JP) .................. 2017-050798

(51) Int. Cl.
| | | |
|---|---|---|
| *G02B 6/35* | (2006.01) | |
| *G02B 27/09* | (2006.01) | |
| *H04B 10/114* | (2013.01) | |
| *G02B 26/08* | (2006.01) | |

(52) U.S. Cl.
CPC ....... *G02B 6/3512* (2013.01); *G02B 27/0977* (2013.01); *H04B 10/1149* (2013.01); *G02B 26/0816* (2013.01)

(58) Field of Classification Search
CPC .............. G02B 6/3512; G02B 27/0977; G02B 26/0816; H04B 10/1149
USPC ................ 359/237, 238, 240, 245, 246, 247
See application file for complete search history.

(56) References Cited

U.S. PATENT DOCUMENTS

| | | | | |
|---|---|---|---|---|
| 6,771,426 B2 * | 8/2004 | Yamamoto | ........... | G02B 6/3524 359/619 |
| 2001/0009466 A1 | 7/2001 | Shiratama | | |
| 2014/0133800 A1 | 5/2014 | Hino et al. | | |

FOREIGN PATENT DOCUMENTS

| | | |
|---|---|---|
| JP | S63-293666 A | 11/1988 |
| JP | S63-294140 A | 11/1988 |
| JP | H05-206946 A | 8/1993 |
| JP | H07-135485 A | 5/1995 |
| JP | H07-143063 A | 6/1995 |
| JP | H11-98082 A | 4/1999 |
| JP | 2001-203641 A | 7/2001 |
| JP | 2002-314101 A | 10/2002 |
| JP | 2005-027227 A | 1/2005 |
| JP | 2011-028235 A | 2/2011 |
| WO | 2012/172760 A1 | 12/2012 |
| WO | 2015/190127 A1 | 12/2015 |

OTHER PUBLICATIONS

Japanese Office Action for JP Application No. 2017-050798 dated May 15, 2018 with English Translation.
Japanese Office Action for JP Application No. 2017-050798 dated Nov. 6, 2018 with English Translation.

* cited by examiner

*Primary Examiner* — Tuyen Tra

(57) ABSTRACT

An optical space transmission system includes a first optical collimator configured to transmit collimated light and change a directivity of transmitted collimated light, a second optical collimator configured to receive collimated light and change a directivity of received collimated light, and a reflector that is fixed and arranged on an optical path through which the first optical collimator and the second optical collimator are optically connected to each other.

16 Claims, 11 Drawing Sheets

FIG. 4

| | 101→102 | 101→103 |
|---|---|---|
| 101 | X1 | X2 |
| 102 | Y1 | – |
| 103 | – | Z2 |

FIG. 9

|  | 101→102 | 101→103 | 104→103 |
|---|---|---|---|
| 101 | A1 | A2 | – |
| 102 | B1 | – | – |
| 103 | – | C2 | C3 |
| 104 | – | – | D3 |

…

OPTICAL SPACE TRANSMISSION SYSTEM

This application is based upon and claims the benefit of priority from Japanese Patent Application No. 2017-050798, filed on Mar. 16, 2017, the disclosure of which is incorporated herein in its entirety by reference.

TECHNICAL FIELD

The present invention relates to an optical space transmission system having a function to switch an optical path between optical collimators.

BACKGROUND ART

As a communication technology in which high-speed optical transmission can be achieved without laying optical fiber, an optical space transmission system is known. In a common optical space transmission system, an optical transmitter and an optical receiver are connected to each other by using collimated light that is approximately parallel light. In relation to the present invention, in International Publication No. WO2012/172760, there is described a configuration in which an optical path is switched by a matrix optical switch using micro electro mechanical systems (MEMS) technology.

SUMMARY

An example object of the invention is to provide technology to connect between optical collimators that cannot be directly faced to each other and switch an optical path between the optical collimators by a simple configuration.

A system according to an example aspect of the invention includes:
a first optical collimator configured to transmit collimated light and change a directivity of transmitted collimated light;
a second optical collimator configured to receive collimated light and change a directivity of received collimated light; and
a reflector that is fixed and arranged on an optical path through which the first optical collimator and the second optical collimator are optically connected to each other.

A method according to an example aspect of the invention includes arranging a reflector fixed on an optical path through which a first optical collimator of which a directivity of transmitted collimated light can be changed is optically connected to a second optical collimator of which a directivity of received collimated light can be changed.

A tangible and non-transitory recording medium according to an example aspect of the invention includes a program of an optical space transmission system which causes a computer included in an optical space transmission system, the system including a reflector fixed on an optical path through which a first optical collimator of which a directivity of transmitted collimated light can be changed is optically connected to a second optical collimator of which a directivity of received collimated light can be changed, the program performing:
a procedure for receiving a connection request from one of the first and second optical collimators to be optically coupled to each other, the connection request asking coupling to another optical collimator;
a procedure for reading the directivities of the first and second optical collimators that are optically coupled to each other from a table in which the directivities of the first and second optical collimators optically coupled to each other are recorded; and
a procedure for instructing the first optical collimator and the second optical collimator to set the directivities of the optical collimators to the directivities read from table.

BRIEF DESCRIPTION OF THE DRAWINGS

Exemplary features and advantages of the present invention will become apparent from the following detailed description when taken with the accompanying drawings in which:

FIG. 4 shows an example of a table showing a setting of directivities of optical collimators 101 to 103, FIG. 9 shows an example of a table showing a setting of directivities of optical collimators 101 to 104.

EXAMPLE EMBODIMENT

Figure 1:
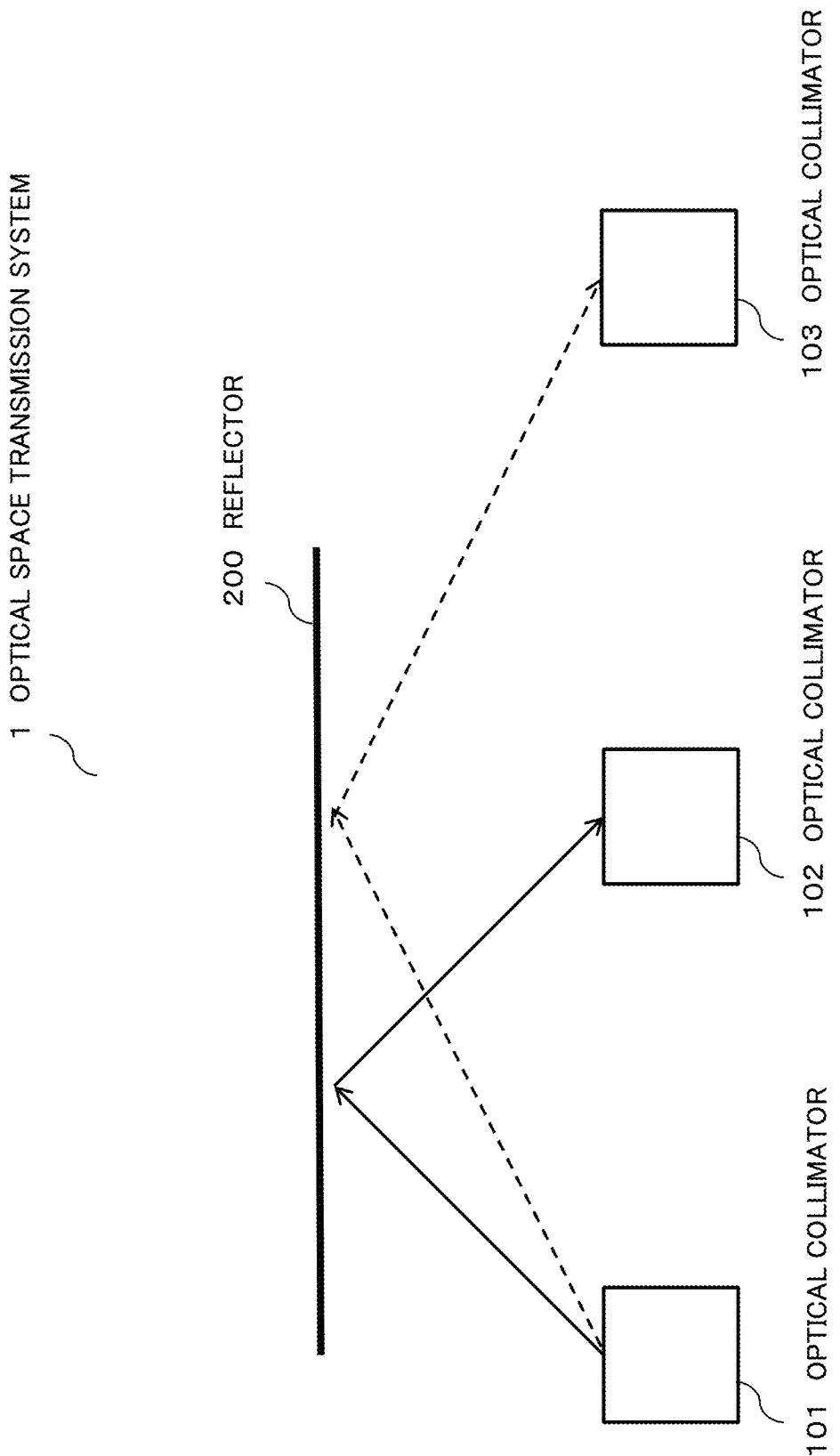
FIG. 1 illustrates an example of configuration of an optical space transmission system 1 according to a first example embodiment.

An example embodiment of the present invention will be described below. Further, a direction of an arrow in the drawing of each example embodiment indicates a direction of a signal flow. The direction of each of the arrows is an example. Therefore, the direction of the signal flow and a type of the signal are not limited to these description and drawings.

First Example Embodiment

FIG. 1 is a figure illustrating an example of configuration of an optical space transmission system 1 according to a first example embodiment of the present invention. The optical space transmission system 1 includes optical collimators 101, 102, and 103 and a reflector 200. The optical collimator 101 (first optical collimator) is an optical transmitter that can transmit approximately parallel lights (collimated light). The optical collimators 102 and 103 (second optical collimators) are optical receivers that can receive the collimated light transmitted by the optical collimator 101. Further, a direction (directivity) of the collimated light that is transmitted and received by the optical collimators 101 to 103 can be changed. The reflector 200 is fixed and reflects the collimated light. The reflector 200 is arranged on the optical path through which the optical collimators 101 and 102 are optically coupled each other and the optical path through which the optical collimators 101 and 103 are optically coupled each other. In the figures shown later, a solid line and a dashed line connecting between the optical collimators indicate the optical path of the collimated light.

The optical space transmission system 1 with such configuration can connect between the optical collimators that cannot directly face to each other and switch the connection between the optical collimators by a simple configuration.

Second Example Embodiment

Figure 2:
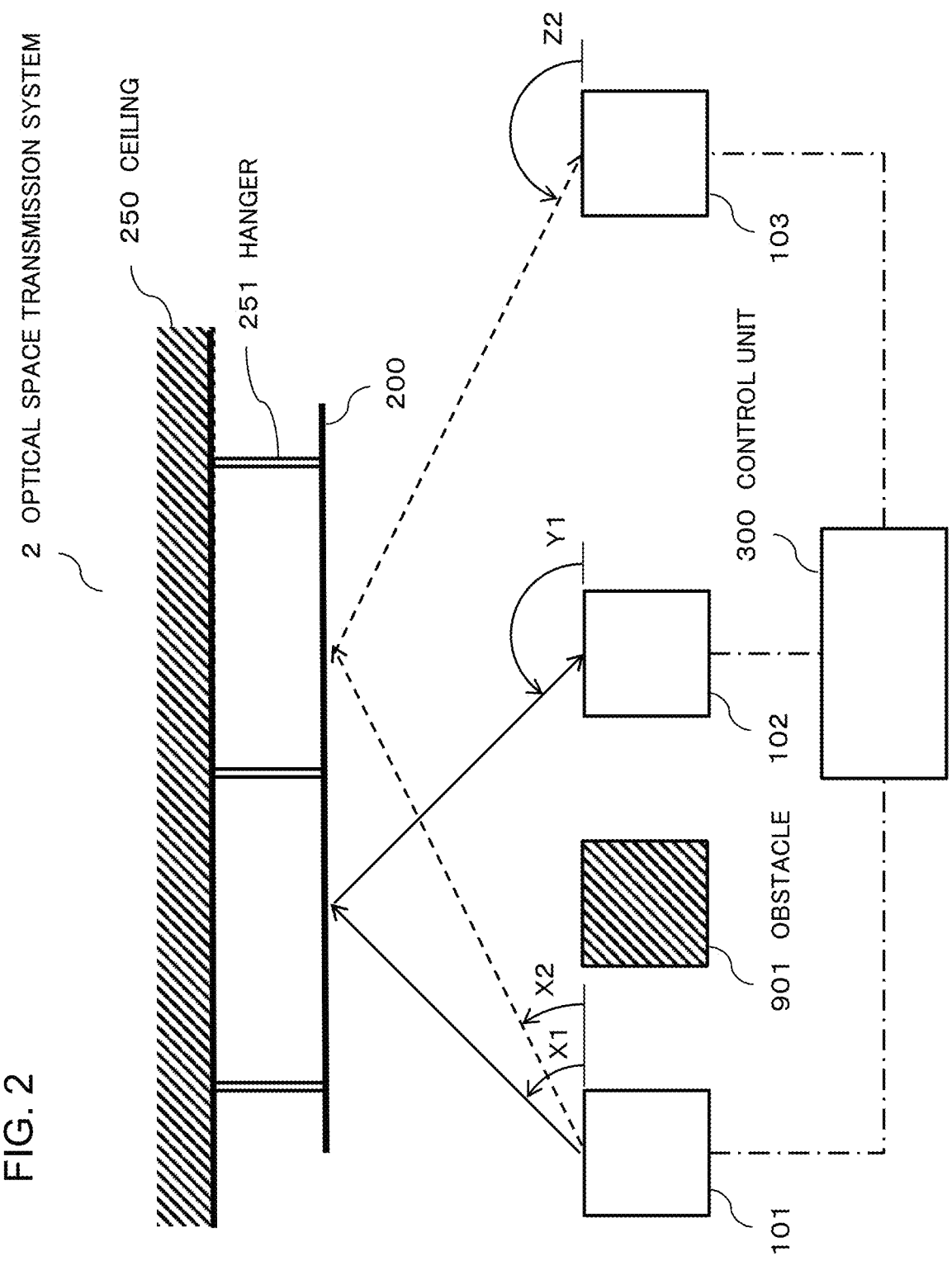
FIG. 2 illustrates an example of configuration of an optical space transmission system 2 according to a second example embodiment.

FIG. 2 is a figure illustrating an example of configuration of an optical space transmission system 2 according to a second example embodiment of the present invention. The same reference numbers are used for the elements having the same function as the already described one in the figures shown later and the description of the element will be omitted appropriately. In FIG. 2, the optical collimators 101 to 103 are installed indoors. The reflector 200 is a reflecting plate hanging from a ceiling 250 by a hanger 251. The reflector 200 reflects the collimated light transmitted from the optical collimator 101 in a direction toward the optical collimator 102 or the optical collimator 103. As the reflector 200, a mirror-finished metal plate or a reflecting plate composed of a substrate on which dielectric multilayer films are formed by vapor deposition is used. Further, an obstacle 901 exists between the optical collimator 101 and the optical collimator 102. The obstacle 901 is another optical collimator or another device.

The optical space transmission system 2 includes a control unit 300. The control unit 300 changes the directivities of the optical collimators to be coupled to each other based on a connection request from one of the optical collimators 101 to 103. The optical collimators 101 to 103 and the control unit 300 are connected by a wired or wireless control line for transmitting and receiving a control signal. In FIG. 2, the control line is indicated by a dashed-dotted line. Because the control line with large capacity is not required for transmission of the control signal, the control line may be a relatively low speed line. For example, a wireless LAN network or a visible light communication network may be used as the control line.

The optical collimators 101 to 103 and the obstacle 901 are approximately linearly arranged. The optical collimators 101 and 102 cannot directly face to each other due to the obstacle 901. The optical collimator 101 can be optically coupled to the optical collimator 102 by using the reflector 200. Further, the optical collimators 101 and 103 cannot directly face to each other due to the obstacle 901. The optical collimator 101 can be optically coupled to the optical collimator 103 by using the reflector 200. Namely, when the optical collimator 101 transmits the collimated light toward the reflector 200, and the optical collimators 102 or 103 receive the reflected collimated light, the optical path through which the obstacle 901 is bypassed can be formed.

Further, in FIG. 2, the arrangement of the optical collimators 101 to 103 and the reflector 200 and the optical path of the collimated light are typically illustrated for explaining the example embodiment as an example. The configuration shown in FIG. 2 does not necessarily show the essential element. Further, the number of the optical collimators of which the optical space transmission system 2 is composed is not limited to three.

Figure 3:
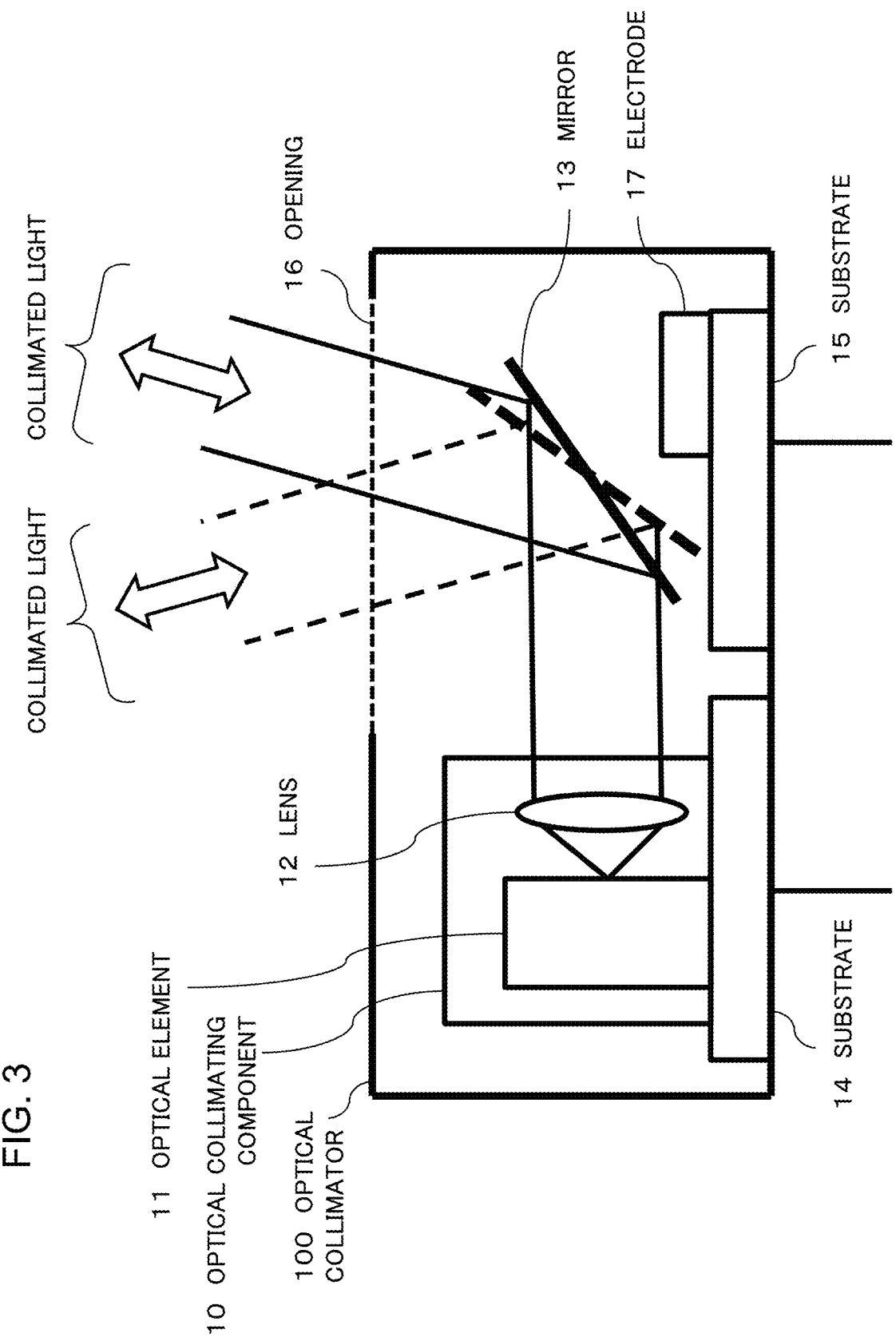
FIG. 3 illustrates an example of configuration of an optical collimator 100 used in an optical space transmission system 2.

FIG. 3 is a figure illustrating an example of an internal structure of the optical collimators 101 to 103. In FIG. 3 and the explanation described below, "optical collimator 100" is used as a generic expression of the optical collimators 101 to 103. The optical collimator 100 includes an optical collimating component 10, a mirror 13, substrates 14 and 15, and an electrode 17. The optical collimating component 10 is an optical part that is configured to be coupled to the collimated light and includes an optical element 11 and a lens 12. The optical element 11 included in the optical collimator 101 shown in FIG. 2 is an optical emitting component such as a semiconductor laser diode or the like. The optical element 11 included in the optical collimators 102 and 103 shown in FIG. 2 is an optical receiving component such as a photodiode or the like. The optical element 11 is formed on the substrate 14 and electrically connected to an outside of the optical collimator 100 via the substrate 14. When the optical element 11 is an optical emitting component, the collimated light outputted by the optical collimating component 10 is intensity-modulated by an electric signal (data signal) applied from the outside. When the optical element 11 is an optical receiving component, the optical collimating component 10 demodulates the received collimated light and outputs an electric signal in response to the intensity of the received collimated light to the outside. By optically coupling an optical collimator including the optical emitting component and an optical collimator including the optical receiving component, the optical space transmission system 2 can transmit the data signal. Further, a modulation/demodulation method in which the collimated light is modulated by/demodulated to the data signal is not limited to intensity modulation. Phase modulation or frequency modulation can be used.

A wavelength of the collimated light transmitted and received by the optical collimator 100 is not limited. For example, an optical emitting component and an optical receiving component for a 1.3 μm band or a 1.55 μm band widely used in the optical fiber transmission system can be adopted. Because an optical waveguide device used in these bands is in practical use, a function of the optical collimator using an optical waveguide can be easily improved.

The lens 12 optically couples the optical element 11 to the collimated light. The optical collimator 100 includes an opening 16 through which the collimated light is inputted and outputted. The opening 16 is an optically transparent part that is formed of glass or the like. Further, the light transmitted by the optical collimating component 10 may not be the collimated light if two optical collimators that are optically coupled to each other can be communicate with each other. Further, the light received by the optical collimating component 10 may not be the collimated light if two optical collimators that are optically coupled to each other can be communicate with each other.

The mirror 13 is an optical element for reflecting a light that is formed on the substrate 15. For simplification of description, a support structure of the mirror 13 is not shown in FIG. 3. An angle (tilt angle) of the mirror 13 is changed in such a way that the collimated light inputted/outputted through the opening 16 is coupled to the optical collimating component 10. As the mirror 13, a micro mirror using Micro Electro Mechanical Systems (MEMS) technology can be used. The electrode 17 is provided in the neighborhood of the mirror 13 and electrically connected to the outside of the optical collimator 100 via the substrate 15. The tilt angle of the mirror 13 can be controlled by applying a voltage to the electrode 17.

The control unit 300 controls the tilt angle of the mirror 13 by changing the voltage applied to the electrode 17 of the optical collimator 100. In FIG. 3, by changing the voltage applied to the electrode 17, the tilt angle of the mirror 13 is controlled in such a way that the tilt angle is set to either the tilt angle shown by a solid line or the tilt angle shown by a dashed line. As a result, the direction of the collimated light (namely, the directivity) coupled to the optical collimating component 10 is changed either in the direction shown by the solid line or in the direction shown by the dashed line. Thus, when the optical collimator 100 is the optical transmitter, by adjusting the voltage applied to the electrode 17, the directivity of the transmitted collimated light can be controlled. Further, when the optical collimator 100 is the optical receiver, by adjusting the voltage applied to the electrode 17, a collimated light selected from among a plurality of the collimated lights whose arrival directions are different from each other can be received. By the above mentioned operation, the directivity of the optical collimator 100 including the mirror 13 can be controlled. Further, the structure shown in FIG. 3 and the direction of the collimated light are shown as an example. By changing the design of the optical collimating component 10 and the mirror 13, the optical collimator 100 of which the direction of the collimated light and its variable range are different from those of the above-mentioned example can be fabricated. Further, the tilt angle of the mirror may be set to three or more different angles and the directions of the collimated lights reflected by the mirror set to three or more different tilt angles are not necessarily in the same plane.

In FIG. 2, the optical path of the collimated light which propagates between the optical collimator 101 and the optical collimator 102 or the optical collimator 103 is selected by setting the directivities of the optical collimators 101 to 103. As described above, the directivity of the optical collimator is set by the tilt angle of the mirror 13. In FIG. 2, the directivities of the optical collimators 101 to 103 are shown as angles (X1, X2, Y1, and Z2) between the collimated light and the horizontal direction in the figure as an example. In FIG. 2, when the directivity of the optical collimator 101 is X1 and the directivity of the optical collimator 102 is Y1, the optical collimator 101 and the optical collimator 102 can be optically coupled to each other via the reflector and communicated with each other. That is, the collimated light transmitted by the optical collimator 101 can be received by the optical collimator 102. Further, a reference from which the angle is measured and an expression form of the directivity can be arbitrarily determined if the direction of the collimated light to be transmitted and received can be uniquely determined. The directivity may be expressed as a unit vector indicating the direction in a two-dimensional plane or a three-dimensional space.

A relation between the directivities which can be set to the optical collimators 101 to 103 and the optical collimators which can be coupled to each other can be obtained based on the transmission-reception direction of the collimated light and a setting range of the directivities of the optical collimators 101 to 103 at the time of installing the optical collimators 101 to 103. The obtained relation is recorded in the control unit 300 as a table. The control unit 300 searches this table by using a combination of two optical collimators to be coupled with each other as a key and thereby, can get the directivities to be set to the two optical collimators to be coupled with each other.

Figure 4:
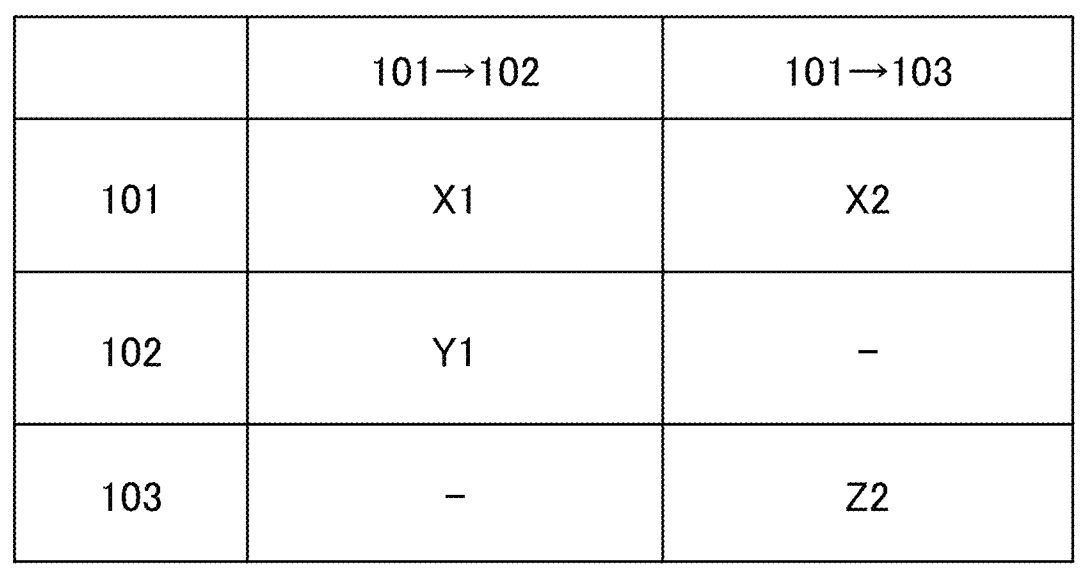

FIG. 4 shows an example of the table showing the directivities to be set to the optical collimators 101 to 103. In FIG. 4, the reference numbers (101 to 103) used in this example embodiment are used as identification information of the optical collimator. In a case in which the collimated light transmitted by the optical collimator 101 is received by the optical collimator 102, the control unit 300 refers to a "101→102" column of the table shown in FIG. 4, sets the directivity of the optical collimator 101 to X1, and sets the directivity of the optical collimator 102 to Y1. As a result, the light transmitted by the optical collimator 101 is received by the optical collimator 102. In a case in which the collimated light transmitted by the optical collimator 101 is received by the optical collimator 103, the control unit 300 refers to a "101→103" column of the table shown in FIG. 4, sets the directivity of the optical collimator 101 to X2, and sets the directivity of the optical collimator 103 to Z2. As a result, the light transmitted by the optical collimator 101 is received by the optical collimator 103. In the table of FIG. 4, a "-" sign means that the directivity of the optical collimator can be set to an arbitrary value.

The setting ranges of the respective directivities of the optical collimators 101 to 103 are determined by specifications (namely, the configuration and the arrangement of the optical collimating component 10 and the mirror 13 described in FIG. 3) of the respective optical collimators. The specifications of the optical collimators 101 to 103 and the installation places of the optical collimators 101 to 103 are determined in such a way that the optical path can be formed between two optical collimators to be optically coupled to each other based on a combination of the directivities that can be set to the respective optical collimators.

Figure 5:
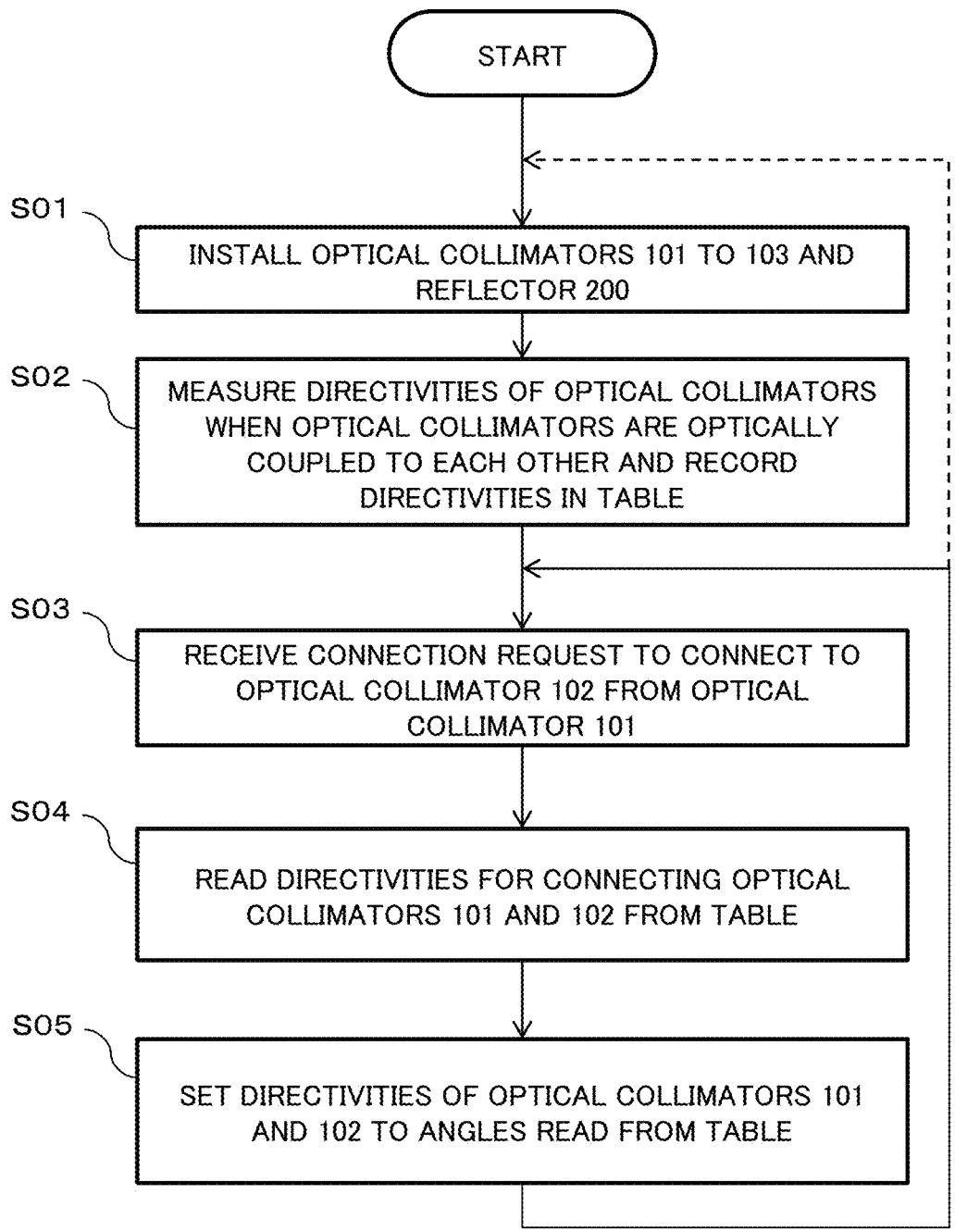
FIG. 5 is a flowchart showing an example of an operation procedure of an optical space transmission system 2.

FIG. 5 is a flowchart showing an example of an installation procedure of the optical collimators 101 to 103. First, the optical collimators 101 to 103 for performing the optical space transmission and the reflector 200 are installed (step S01 in FIG. 5). When the optical collimators 101 to 103 are installed, the optical collimators to be optically coupled to each other are experimentally set in such a way that the optical collimators emit and receive light. The installation positions of the optical collimators 101 to 103 are adjusted and the directivity is selected in such a way that two optical collimators can be optically coupled to each other by the collimated light. Specifically, the installation positions of the optical collimators 101 to 103 are adjusted and the directivity is selected in such a way that the collimated light reflected by the reflector 200 can be received by the optical collimator 102 or the optical collimator 103 by only selecting the directivities of the optical collimators 101 to 103. After performing the above-mentioned adjustment, the positions of the optical collimators 101 to 103 may be fixed. In this case, it is desirable that the adjustment of the installation positions of the optical collimators 101 to 103 and the selection of the directivity are performed in such a way that when another optical collimator is optically coupled, it can be realized by controlling only the directivity. The relation between the optical collimators that are optically coupled to each other and the directivities to be set to these optical collimators are recorded in the control unit 300 as the table shown in FIG. 4 as an example (step S02).

After installing the optical collimators 101 to 103, operation of the optical space transmission system 2 is started. A procedure used when the optical collimator 101 requests the connection to the optical collimator 102 in the optical space transmission system 2 shown in FIG. 2 will be described below.

The optical collimator 101 transmits a connection request to connect to the optical collimator 102 to the control unit 300 through a control line. The connection request includes information for identifying the optical collimator which transmits the collimated light and the optical collimator which receives the collimated light. When the control unit 300 receives the connection request from the optical collimator 101 (step S03), the control unit 300 reads the directivity for connecting the optical collimator 101 and the optical collimator 102 from the table shown in FIG. 4 (step S04). Here, the control unit 300 uses a "101→102" sign indicating that the light is transmitted from the optical collimator 101 to the optical collimator 102 as a key and reads values X1 and Y1 that are directivities to be set to the optical collimators 101 and 102 from a "101→102" column of the table.

The control unit 300 instructs the optical collimators 101 and 102 to set the respective directivities to angles (values X1 and Y1) read from the table through the control line (step S05). Namely, the control unit 300 transmits an instruction for instructing the optical collimator 101 to set the directivity to X1 and transmits an instruction for instructing the optical collimator 102 to set the directivity to Y1. In this manner, the optical collimator 101 and the optical collimator 102 are optically coupled to each other and the optical space transmission becomes possible between both optical collimators.

When the optical path is switched from the optical path between the optical collimator 101 and the optical collimator 102 to the optical path between the optical collimator 101 and the optical collimator 103, the control unit 300 performs the procedures similar to the procedures of steps S03 to S05. Specifically, when the control unit 300 receives a request to connect the optical collimator 101 and the optical collimator 103, the control unit 300 reads the values of the directivities used for connecting between the optical collimator 101 and the optical collimator 103 from the table shown in FIG. 4 (procedures corresponding to steps S03 to S04). The control unit 300 uses a "101→103" sign indicating that the light is transmitted from the optical collimator 101 to the optical collimator 103 as a key and reads values X2 and Z2 that are directivities to be set to the optical collimators 101 and 103 from a "101→103" column of the table. The read directivities (read values) are set to the optical collimators 101 and 103, respectively (procedures corresponding to steps S04 and S05). In this manner, whenever the connection request is newly issued, the control unit 300 performs the procedures corresponding to steps S03 to S05 to the optical collimators to be newly connected.

When another optical collimator is added after performing the procedure of step S04, the process goes back to step S01 via the dashed line in the flowchart shown in FIG. 5. The directivities of the added optical collimator and the optical collimator to be optically coupled to the added optical collimator are added to the table shown in FIG. 4.

Further, the connection request of the optical collimator may not be issued by the optical collimator 101 of a light emission side (a transmission side). The optical collimator 102 or the optical collimator 103 of a reception side may designate the optical collimator 101 of the transmission side and transmit the connection request to the control unit 300.

As described above, when the control unit 300 receives the connection request in which one of two optical collimators to be optically coupled to each other asks to be connected to another optical collimator, the control unit 300 functions as control means or a controller which notify the two optical collimators to be optically coupled to each other of a control instruction for instructing the two optical collimators to set the respective directivities to the directivities (values) recorded in the table.

The function of the control unit 300 and the operation procedure may be realized by executing a program recorded in a recording medium by a central processing unit (CPU) included in the control unit 300. The program is recorded in a tangible and non-transitory recording medium. The recording medium may be included in the control unit 300. As the recording medium, a semiconductor memory or a hard disk drive can be used. However, it is not limited to these devices.

As described above, the optical space transmission system 2 can connect between the optical collimators that cannot directly face to each other and switch the connection between the optical collimators by a simple configuration.

Third Example Embodiment

Figure 6:
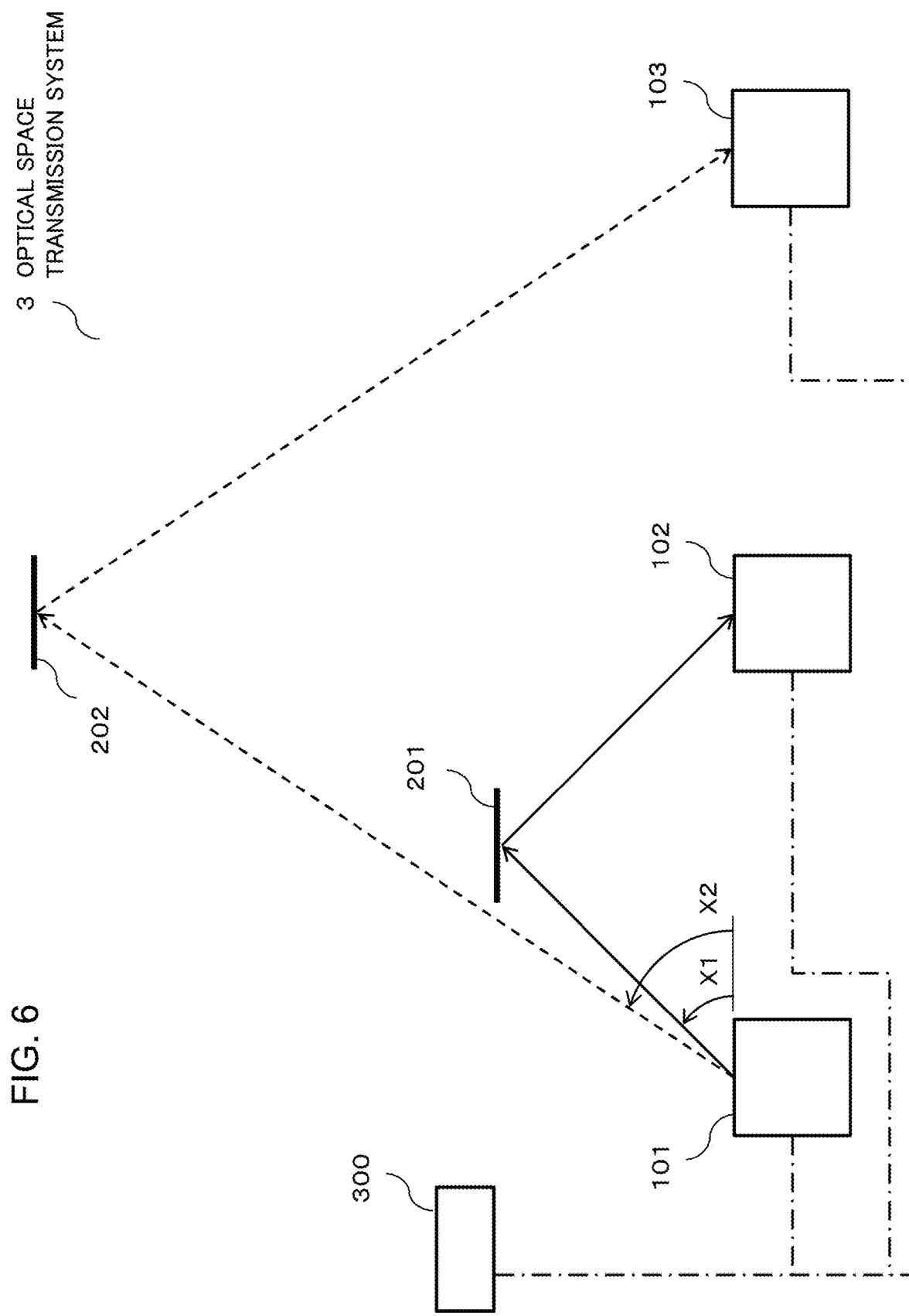
FIG. 6 illustrates an example of configuration of an optical space transmission system 3 according to a third example embodiment.

FIG. 6 is a figure illustrating an example of configuration of an optical space transmission system 3 according to a third example embodiment. In the optical space transmission system 3, two reflectors 201 and 202 are used instead of the reflector 200 according to the first and second example embodiments. The reflectors 201 and 202 are fixed and arranged in such a way that the reflection surfaces of the reflectors are parallel to each other. Further, in FIGS. 6 to 8, the ceiling 250 and the hanger 251 are not shown.

In the optical space transmission system 3, each of the distances between the optical collimators 101, 102 and 103 and the reflector 202 is longer than each of the distances between the optical collimators 101, 102 and 103 and the reflector 201. For this reason, an absolute value of the difference between the directivity X1 of the collimated light when the optical collimator 101 is optically connected to the optical collimator 102 and the directivity X2 of the collimated light when the optical collimator 101 is optically connected to the optical collimator 103 is smaller than an absolute value of the difference between the directivity X1 and the directivity X2 set in the second example embodiment. Accordingly, in the optical space transmission system 3, a directivity setting range of the optical collimator 101 can be made small. Therefore, the optical space transmission system 3 has an effect in which the structure of the optical collimator can be made simple in addition to the effect obtained by the first and second example embodiments.

Fourth Example Embodiment

Figure 7:
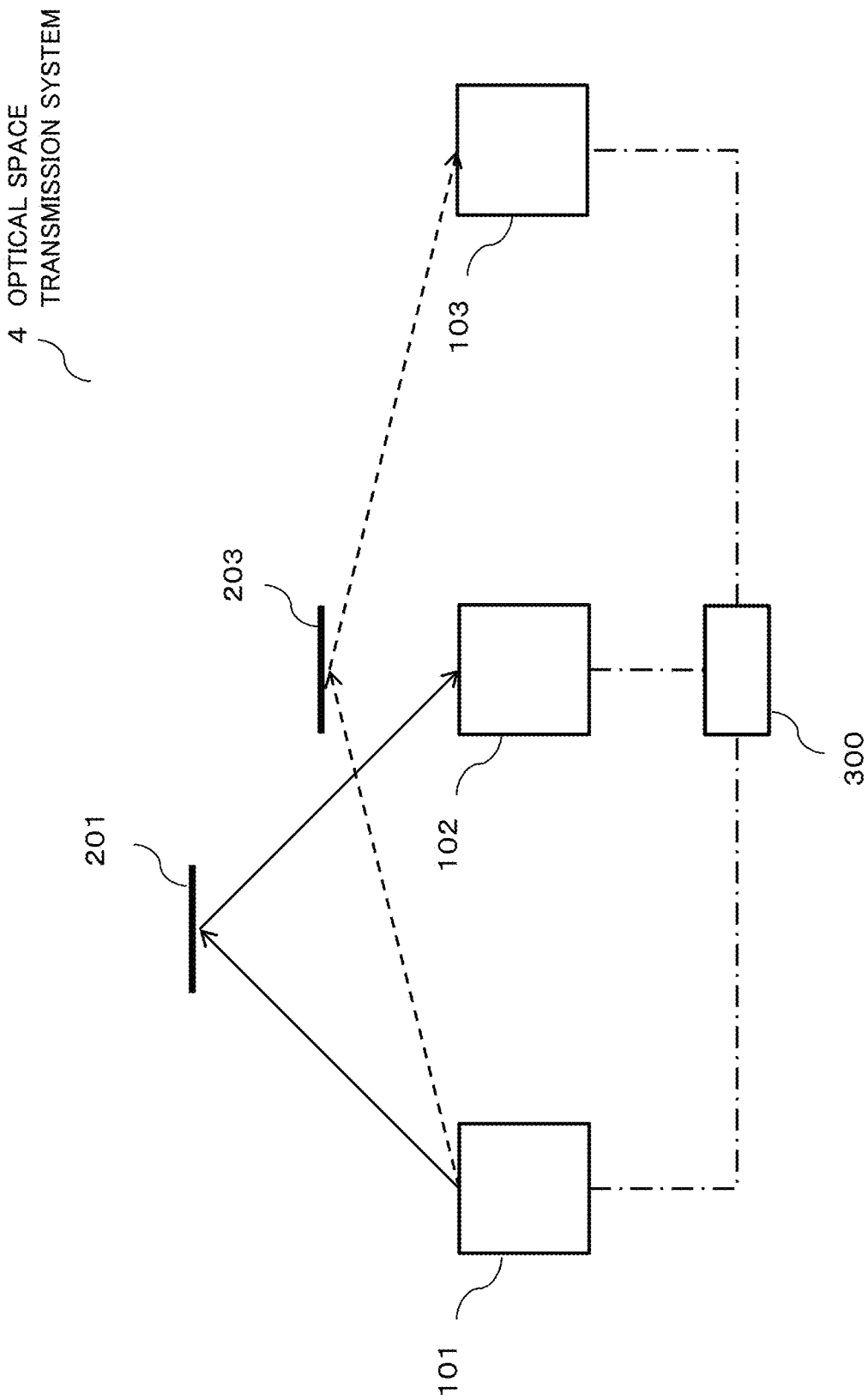
FIG. 7 illustrates an example of configuration of an optical space transmission system 4 according to a fourth example embodiment.

FIG. 7 is a figure illustrating an example of configuration of an optical space transmission system 4 according to a fourth example embodiment. In the optical space transmission system 4, a reflector 203 is used instead of the reflector 202 according to the third example embodiment. The reflectors 201 and 203 are fixed and arranged in such a way that the reflection surfaces of the reflectors 201 and 203 are parallel to each other. In the optical space transmission system 3, each of the distances between the optical collimators 101, 102 and 103 and the reflector 203 is shorter than each of the distances between the optical collimators 101, 102 and 103 and the reflector 201. When such configuration is used, a propagation distance of the collimated light transmitted from the optical collimator 101 to the optical collimator 103 is shorter than that of collimated light transmitted from the optical collimator 101 to the optical collimator 102 in the first and second example embodiments. Accordingly, in the optical space transmission system 4, a propagation loss of the collimated light is small. Therefore, the optical space transmission system 4 has an effect in which the distance between the optical collimator 101 and the optical collimator 103 can be increased in addition to the effect obtained by the first and second example embodiments.

In the third and fourth example embodiments, the reflectors 201 to 203 are arranged in such a way that the reflection surfaces of them are parallel to each other. However, the reflectors 201 to 203 may be arranged in such a way that the reflection surfaces of them are not parallel to each other if the optical collimator 101 can be optically connected to the optical collimators 102 and 103.

Fifth Example Embodiment

Figure 8:
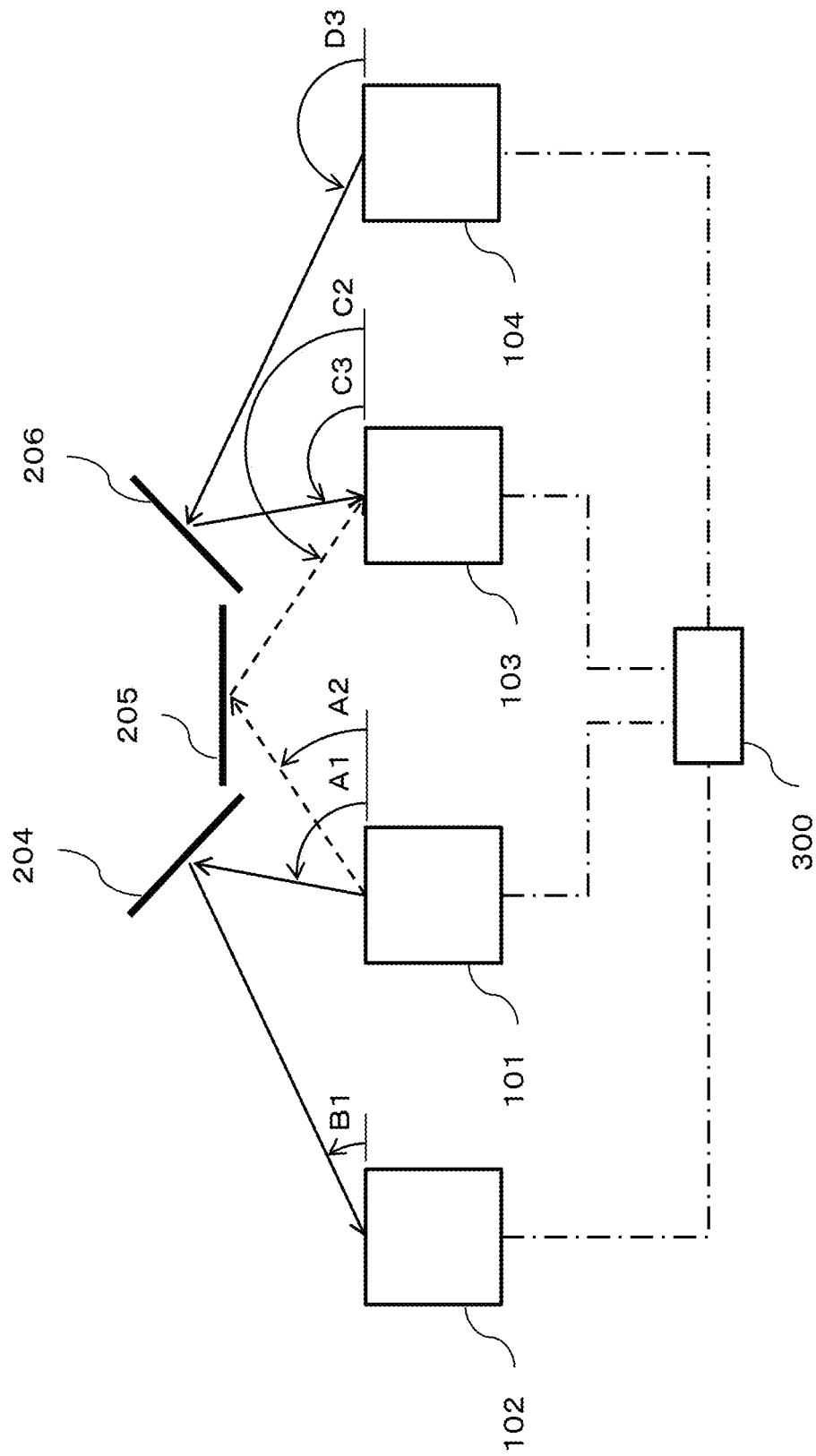
FIG. 8 illustrates an example of configuration of an optical space transmission system 5 according to a fifth example embodiment.

FIG. 8 is a figure illustrating an example of configuration of an optical space transmission system 5 according to a fifth example embodiment. The optical space transmission system 5 includes the optical collimators 101 and 104 that transmit the collimated light, the optical collimators 102 and 103 that receive the collimated light, reflectors 204 to 206 that reflect the collimated light, and the control unit 300. The reflectors 204 to 206 are the reflectors for reflecting the collimated light like the reflector 200. The reflection surface of the reflector 204 is fixed and arranged in such a way that an angle between the reflection surface of the reflector 204 and the reflection surface of the reflector 205 is, for example, greater than 90 degree and less than 180 degrees. The reflection surfaces of the reflector 206 is fixed and arranged in such a way that an angle between the reflection surface of the reflector 206 and the reflection surface of the reflector 205 is, for example, greater than 0 degree and less than 90 degrees.

The optical collimator 101 transmits the collimated light in a direction toward the reflector 204 or the reflector 205. The optical collimator 104 transmits the collimated light in a direction toward the reflector 206. The optical collimator 102 receives the collimated light reflected by the reflector 204. The optical collimator 103 receives the collimated light reflected by the reflector 205 or the reflector 206. In FIG. 8, the directivities of the optical collimators 101 to 104 are shown as angles (A1, A2, B1, C2, C3, and D3) of elevation from a horizontal direction in the figure as an example.

The control unit 300 controls a voltage applied to the electrode 17 of the optical collimator in such a way that the directivities of the optical collimators to be optically coupled to each other are adjusted based on the connection request from one of the optical collimators 101 to 104. Further, the directivity setting range of each optical collimator and the number of the directions in which the directivities can be set may be different for each optical collimator like the second example embodiment. Further, the number of the optical collimators included in the optical space transmission system 5 is not limited to four.

FIG. 9 shows an example of the table that shows a combination of the optical collimators that can be optically coupled to each other among the optical collimators 101 to 104 and the directivity to be set to each optical collimator for each combination. For example, when the optical collimator 101 and the optical collimator 102 are optically coupled to each other, the control unit 300 refers to a "101→102" column of the table shown in FIG. 9, sets the directivity of the optical collimator 101 to A1, and sets the directivity of the optical collimator 102 to B1. As a result, the optical collimator 102 can receive the collimated light transmitted by the optical collimator 101.

In FIG. 9, the "-" sign means that the directivity of the optical collimator can be set to an arbitrary value. Accordingly, the connection to the optical collimator 102 from the optical collimator 101 and the connection to the optical collimator 103 from the optical collimator 104 can be established simultaneously.

As described above, the optical space transmission system 5 can connect between the optical collimators that cannot directly face to each other and switch the connection between the optical collimators by a simple configuration. Further, in the optical space transmission system 5, the reflectors 204 and 206 are tilted with respect to the reflector 205. For this reason, the optical space transmission system 5 has an effect in which the directivity setting ranges of the optical collimators 101 and 103 can be made small in comparison with a case in which the reflectors 204 to 206 are formed as a single piece like the reflector 200 according to the first example embodiment.

Sixth Example Embodiment

Figure 10:
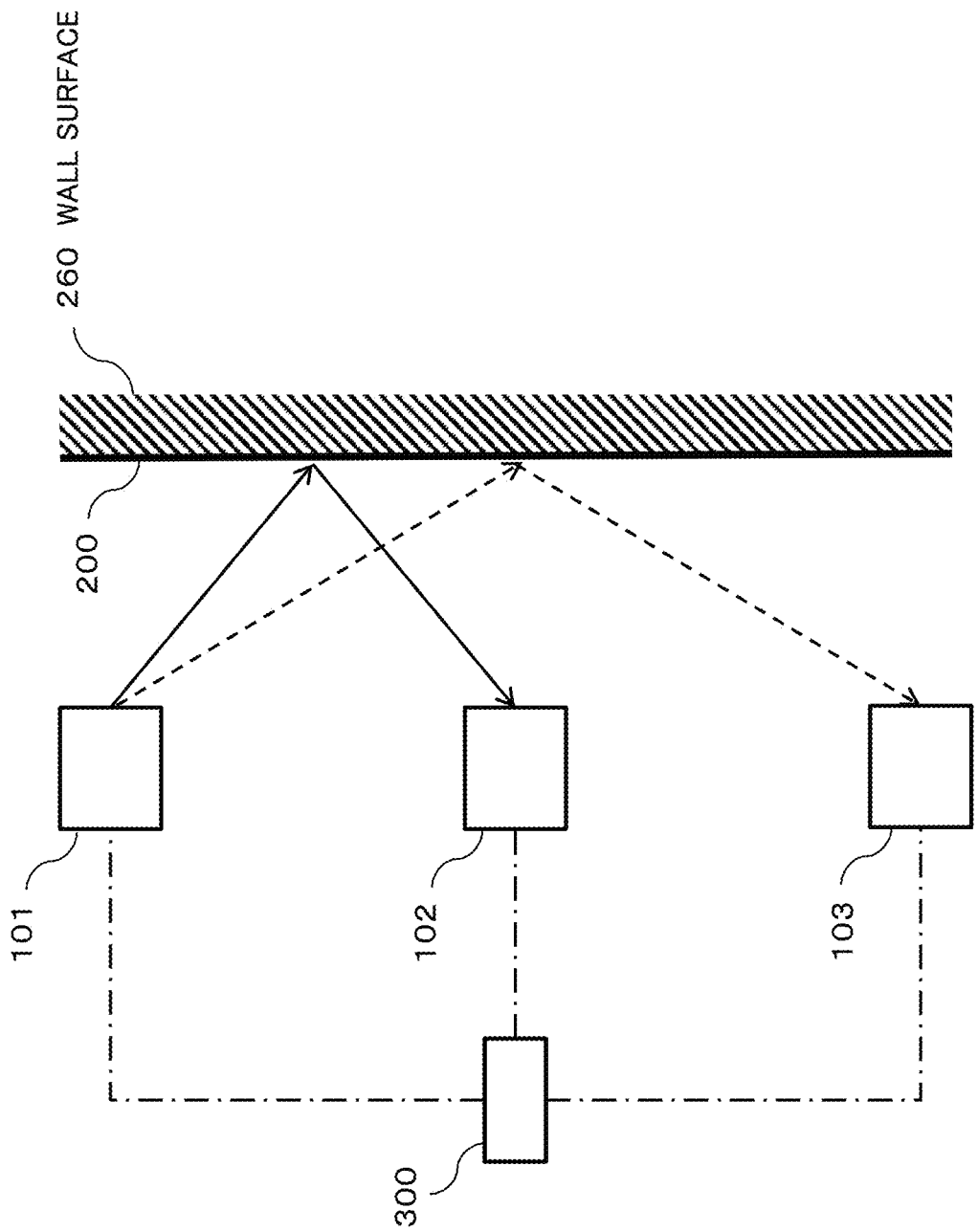
FIG. 10 illustrates an example of configuration of an optical space transmission system 6 according to a sixth example embodiment.

FIG. 10 is a figure illustrating an example of a top view of an optical space transmission system 6 according to a sixth example embodiment. In FIG. 2 of the second example embodiment, the reflector 200 hangs from the ceiling 250. However, it is not necessary to arrange the reflector 200 above the optical collimators 101 to 103. In FIG. 10, the reflector 200 is formed on a wall surface 260 whose direction is perpendicular to the drawing and the collimated light transmitted by the optical collimator 101 is propagated in the direction parallel to the drawing, reflected by the reflector 200, and received by the optical collimator 102 or the optical collimator 103.

The optical space transmission system 6 with such configuration can connect between the optical collimators that cannot directly face to each other and switch the connection between the optical collimators by a simple configuration like the first and second example embodiments.

Seventh Example Embodiment

Figure 11:
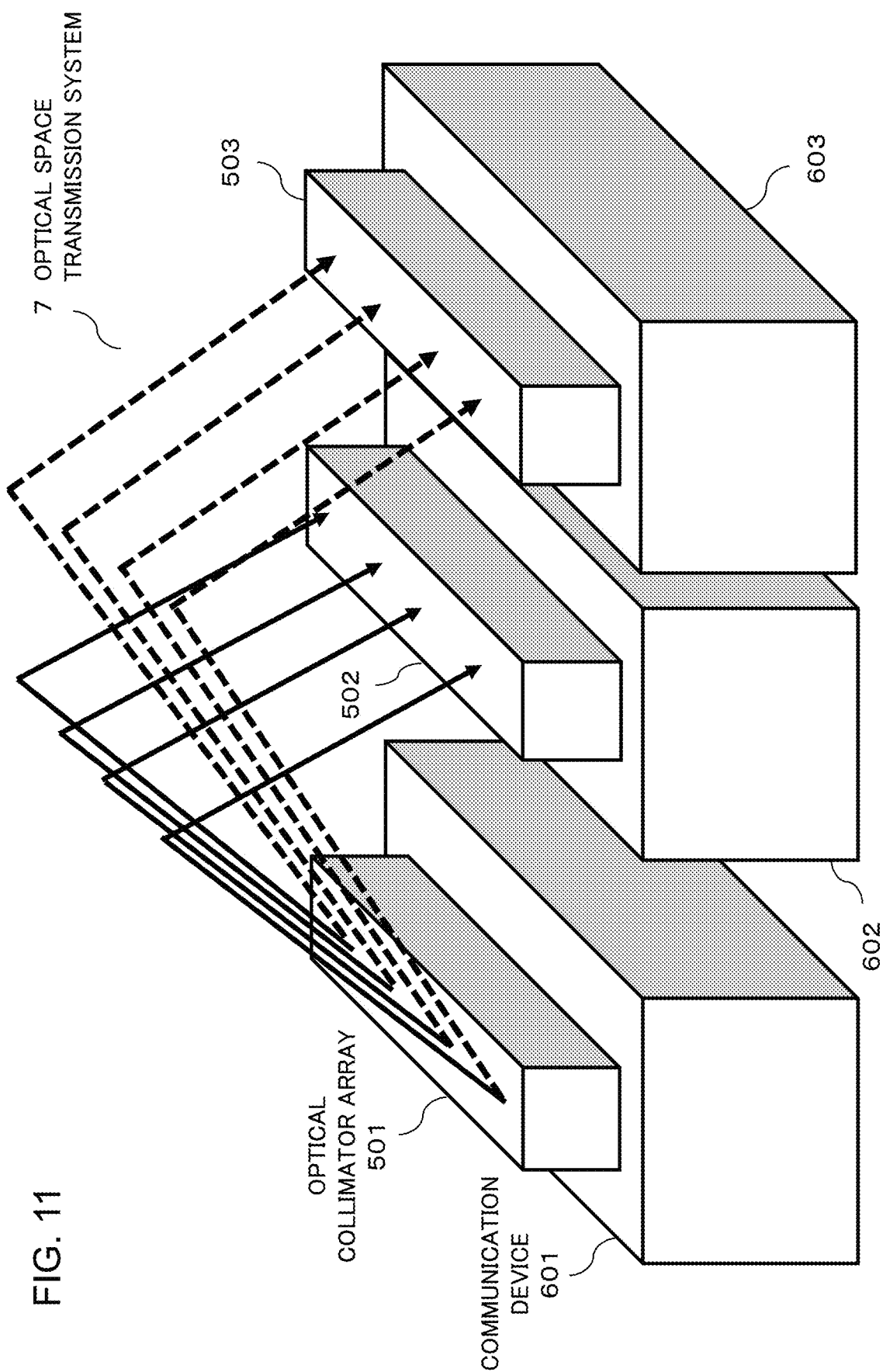
FIG. 11 illustrates an example of configuration of an optical space transmission system 7 according to a seventh example embodiment.

FIG. 11 is a figure illustrating an example of configuration of an optical space transmission system 7 according to a seventh example embodiment of the present invention. The optical space transmission system 7 includes optical collimator arrays 501 to 503 and communication devices 601 to 603. A solid arrow and a dashed arrow indicate the optical path of the collimated light reflected by the reflector 200 hanging from the ceiling. The reflector 200 is arranged on the optical path through which the optical collimator array 501 (a first optical collimator array) is optically connected to the optical collimator array 502, or the optical path through which the optical collimator array 501 is optically connected to the optical collimator array 503 (a second optical collimator array). However, in FIG. 11, for avoidance of complication, the reflector 200 is not shown. The communication device 601 transmits data by using the optical collimator array 501, and the communication devices 602 and 603 receive the data by using the optical collimator arrays 502 and 503. The communication devices 601 to 603 are, for example, large computers or signal processing devices. In FIG. 11, one of the communication devices 601 to 603 has a function of the control unit 300 described in the second to sixth example embodiments.

In the optical collimator array 501, the optical collimators for transmitting the collimated light are arranged in a linear fashion. In the optical collimator arrays 502 and 503, the optical collimators for receiving the collimated light are arranged in a linear fashion. As the optical collimator included in the optical collimator arrays 501 to 503, the optical collimator 100 shown in FIG. 3 can be used. FIG. 11 shows an example in which each of the optical collimator arrays 501 to 503 includes four optical collimators. When the optical collimator array 501 transmits the collimated light to the optical collimator array 502 or the optical collimator array 503, parallel transmission can be achieved between the communication device 601 and the communication device 602 or between the communication device 601 and the communication device 603. A communication destination of the optical collimator array 501 is the optical collimator array 502 or the optical collimator array 503. The optical path for parallel transmission between the communication devices can be switched by simultaneously controlling the directivities of the optical collimators included in the optical collimator arrays 501 to 503. As a procedure used for installing the optical collimator arrays 501 to 503, the procedure explained by using the flowchart shown in FIG. 5 can be applied similarly. The switching of the optical path can be performed by one of the communication devices 601 to 603 which has a function of the control unit 300.

Further, the optical collimator array 501 may transmit the collimated light in such a way that the respective optical collimators transmit the collimated lights to the communication destinations that are different from each other. For example, in a case in which each of the optical collimator arrays 501 to 503 includes four optical collimators, two optical collimators of the optical collimator array 501 may be optically connected to the optical collimator array 502, and two remaining optical collimators may be optically connected to the optical collimator array 503. Thus, the optical space transmission system 7 can build a parallel transmission system in which the communication devices are flexibly connected.

The optical space transmission system 7 with such configuration can optically connect between the optical collimators that cannot directly face to each other and switch the connection between the optical collimators by a simple configuration like the first and second example embodiments. The optical space transmission system 7 has an effect in which highly flexible parallel transmission between the communication devices can be enabled.

Further, the example embodiment of the present invention can be described as the following supplementary note. However, the present invention is not limited to the following supplementary note.

(Supplementary Note 1)
An optical space transmission system comprising
a first optical collimator of which a directivity of transmitted collimated light can be changed,
a second optical collimator of which a directivity of received collimated light can be changed, and
a reflector that is fixed and is arranged on an optical path through which the first optical collimator and the second optical collimator are optically connected to each other.

(Supplementary Note 2)
The optical space transmission system according to supplementary note 1 wherein the reflector is a single sheet of reflecting plate that reflects the collimated light.

(Supplementary Note 3)
The optical space transmission system according to supplementary note 1 wherein as the reflector, two or more sheets of reflecting plates that reflect the collimated light are used.

(Supplementary Note 4)
The optical space transmission system according to supplementary note 3 wherein reflection surfaces of the reflectors are arranged in such a way as to be parallel to each other.

(Supplementary Note 5)
The optical space transmission system according to any one of supplementary notes 1 to 4
wherein
a first optical collimator array comprises a plurality of the first optical collimators,
a second optical collimator array comprises a plurality of the second optical collimators, and
the reflector is arranged on the optical path through which the first optical collimator array and the second optical collimator array are optically connected to each other.

(Supplementary Note 6)
The optical space transmission system according to any one of supplementary notes 1 to 5
wherein
the optical space transmission system further includes control means,
the control means include a table recording directivities of the first and second optical collimators that are optically coupled to each other, and
when the control means receive a connection request in which one of the first and second optical collimators to be optically coupled to each other asks to be coupled to another optical collimator, the control means notify the first and second optical collimators to be optically coupled to each other of a control instruction for instructing the first and second optical collimators to set the directivities of the first and second optical collimators to the directivities recorded in the table.

(Supplementary Note 7)
The optical space transmission system according to any one of supplementary notes 1 to 6,
wherein
the first optical collimator and the second optical collimator include an optical collimating component for inputting and outputting the collimated light and a mirror whose tilt angle can be set to an angle at which the collimated light can be optically coupled to the optical collimating component.

(Supplementary Note 8)
The optical space transmission system according to supplementary note 7,
wherein
the mirror is formed by micro electro mechanical systems technology.

(Supplementary Note 9)
The optical space transmission system according to any one of supplementary notes 1 to 8,
wherein
the first optical collimator includes an optical emitting component and the optical emitting component outputs the collimated light modulated by an applied electric signal.

(Supplementary Note 10)
The optical space transmission system according to any one of supplementary notes 1 to 8,
wherein
the second optical collimator includes an optical receiving component and the optical receiving component outputs an electric signal in response to a strength of the received collimated light.

(Supplementary Note 11)
An optical space transmission method for arranging a reflector fixed on an optical path through which a first optical collimator of which a directivity of transmitted collimated light can be changed is optically connected to a second optical collimator of which a directivity of received collimated light can be changed.

(Supplementary Note 12)

The optical space transmission method according to supplementary note 11 comprising:

receiving a connection request in which one of the first and second optical collimators to be optically coupled to each other asks to be coupled to another optical collimator, reading the directivities of the first and second optical collimators that are optically coupled to each other from a table in which the directivities of the first and second optical collimators optically coupled to each other are recorded, and instructing the first optical collimator and the second optical collimator to set the directivities of the optical collimators to the directivities read from table.

(Supplementary Note 13)

A program of an optical space transmission system which causes a computer included in an optical space transmission system including a reflector fixed on an optical path through which a first optical collimator of which a directivity of transmitted collimated light can be changed is optically connected to a second optical collimator of which a directivity of received collimated light can be changed to perform a procedure for receiving a connection request in which one of the first and second optical collimators to be optically coupled to each other asks to be coupled to another optical collimator, a procedure for reading the directivities of the first and second optical collimators that are optically coupled to each other from a table in which the directivities of the first and second optical collimators optically coupled to each other are recorded, and a procedure for instructing the first optical collimator and the second optical collimator to set the directivities of the optical collimators to the directivities read from table.

The invention of the present application has been described above with reference to the example embodiment. However, the invention of the present application is not limited to the above mentioned example embodiment. Various changes in the configuration or details of the invention of the present application that can be understood by those skilled in the art can be made without departing from the scope of the invention of the present application.

For example, in the first to seventh example embodiments, simplex transmission that uses the optical collimator 100 shown in FIG. 3 as an example has been explained. However, by using an optical collimator that can perform bidirectional transmission using wavelength multiplexing technology or the like, bidirectional transmission can be performed in the optical space transmission system according to each example embodiment. Further, in each example embodiment, the number of the optical collimators is shown as an example. Therefore, the optical space transmission system according to each example embodiment may include more optical collimators than the number of optical collimators included in the optical space transmission system according to each example embodiment mentioned above.

Further, the configurations described in the example embodiments are not necessarily exclusive to each other. The operation and effect of the present invention may be realized by a configuration obtained by combining all or a part of the above-mentioned example embodiments.

REFERENCE SIGNS LIST 1 to 7 optical space transmission system
10 optical collimating component
11 optical element
12 lens
13 mirror
14 and 15 substrate
16 opening
17 electrode
100 to 104 optical collimator
200 to 206 reflector
250 ceiling
251 hanger
260 wall surface
300 control unit
501 to 503 optical collimator array
601 to 603 communication device
901 obstacle

The invention claimed is:

1. An optical space transmission system comprising:

a first optical collimator configured to transmit collimated light and change a directivity of the collimated light as transmitted;

a second optical collimator configured to receive the collimated light transmitted by the first optical collimator and change the directivity of the collimated light as received; and a reflector that is fixed and arranged on an optical path through which the first optical collimator and the second optical collimator are optically connected to each other, wherein the first optical collimator and the second optical collimator comprise optical collimating components configured to input and output the collimated light and mirrors whose tilt angle can be set to an angle at which the collimated light can be optically coupled to the optical collimating components, the reflector is arranged outside of the first optical collimator and the second optical collimator, and the mirrors are arranged inside of the first optical collimator and the second optical collimator.

2. The optical space transmission system according to claim 1, wherein the reflector is a single sheet of reflecting plate that reflects the collimated light.

3. The optical space transmission system according to claim 2, wherein a first optical collimator array comprises a plurality of the first optical collimators, a second optical collimator array comprises a plurality of the second optical collimators, and the reflector is arranged on the optical path through which the first optical collimator array and the second optical collimator array are optically connected to each other.

4. The optical space transmission system according to claim 2, wherein the optical space transmission system further comprises a controller, wherein the controller includes a table that records directivities of the first and second optical collimators that are optically coupled to each other, and when the controller receives a connection request from one of the first and second optical collimators to be optically coupled to each other that asks coupling to another optical collimator, the controller notifies the first and second optical collimators to be optically coupled to each other of a control instruction that instructs the first and second optical collimators to set the directivities of the first and second optical collimators to the directivities recorded in the table.

5. The optical space transmission system according to claim 1,
wherein
the reflector includes two or more sheets of reflecting plates that reflect the collimated light.

6. The optical space transmission system according to claim 5,
wherein
reflection surfaces of the reflecting plates are arranged in such a way as to be parallel to each other.

7. The optical space transmission system according to claim 5,
wherein
a first optical collimator array comprises a plurality of the first optical collimators,
a second optical collimator array comprises a plurality of the second optical collimators, and
the reflector is arranged on the optical path through which the first optical collimator array and the second optical collimator array are optically connected to each other.

8. The optical space transmission system according to claim 5,
wherein
the optical space transmission system further comprises a controller,
wherein
the controller includes a table that records directivities of the first and second optical collimators that are optically coupled to each other, and
when the controller receives a connection request from one of the first and second optical collimators to be optically coupled to each other that asks coupling to another optical collimator, the controller notifies the first and second optical collimators to be optically coupled to each other of a control instruction that instructs the first and second optical collimators to set the directivities of the first and second optical collimators to the directivities recorded in the table.

9. The optical space transmission system according to claim 1,
wherein
a first optical collimator array comprises a plurality of the first optical collimators,
a second optical collimator array comprises a plurality of the second optical collimators, and
the reflector is arranged on the optical path through which the first optical collimator array and the second optical collimator array are optically connected to each other.

10. The optical space transmission system according to claim 1,
wherein
the optical space transmission system further comprises a controller,
wherein
the controller includes a table that records directivities of the first and second optical collimators that are optically coupled to each other, and
when the controller receives a connection request from one of the first and second optical collimators to be optically coupled to each other that asks coupling to another optical collimator, the controller notifies the first and second optical collimators to be optically coupled to each other of a control instruction that instructs the first and second optical collimators to set the directivities of the first and second optical collimators to the directivities recorded in the table.

11. The optical space transmission system according to claim 1,
wherein
the mirror is formed by micro electro mechanical systems technology.

12. The optical space transmission system according to claim 1,
wherein
the first optical collimator comprises an optical emitting component, and the optical emitting component outputs the collimated light modulated by an applied electric signal.

13. The optical space transmission system according to claim 1,
wherein
the second optical collimator comprises an optical receiving component, and the optical receiving component outputs an electric signal in response to a strength of the received collimated light.

14. An optical space transmission method comprising
arranging a reflector fixed on an optical path through which a first optical collimator of which a directivity of transmitted collimated light can be changed is optically connected to a second optical collimator of which a directivity of received collimated light can be changed,
arranging the reflector outside of the first optical collimator and the second optical collimator, and
setting an angle of mirrors so that the collimated light can be optically coupled to optical collimating components that input and output the collimated light, the mirrors and the optical collimating components being arranged in the first optical collimator and the second optical collimator.

15. The optical space transmission method according to claim 14 comprising:
receiving a connection request from one of the first and second optical collimators to be optically coupled to each other, the connection request asking coupling to another optical collimator;
reading the directivities of the first and second optical collimators that are optically coupled to each other from a table in which the directivities of the first and second optical collimators optically coupled to each other are recorded; and
instructing the first optical collimator and the second optical collimator to set the directivities of the optical collimators to the directivities read from table.

16. A tangible and non-transitory recording medium for a program of an optical space transmission system which causes a computer included in an optical space transmission system, the system including a reflector fixed on an optical path through which a first optical collimator of which a directivity of transmitted collimated light can be changed is optically connected to a second optical collimator of which a directivity of received collimated light can be changed, the program performing:
a procedure for receiving a connection request from one of the first and second optical collimators to be optically coupled to each other, the connection request asking coupling to another optical collimator;
a procedure for reading the directivities of the first and second optical collimators that are optically coupled to each other from a table in which the directivities of the first and second optical collimators optically coupled to each other are recorded; and a procedure for instructing the first optical collimator and the second optical collimator to set the directivities of the optical collimators to the directivities read from 5 table.

\* \* \* \* \*